Patented June 20, 1933

1,914,539

UNITED STATES PATENT OFFICE

GEORGE F. A. STUTZ AND HARLAN A. DEPEW, OF PALMERTON, PENNSYLVANIA, ASSIGNORS TO THE NEW JERSEY ZINC COMPANY, OF NEW YORK, N. Y., A CORPORATION OF NEW JERSEY

MANUFACTURE OF PIGMENTS

No Drawing.  Application filed January 23, 1931.  Serial No. 510,766.

This invention relates to the manufacture of pigments by wet chemical precipitation. It is more particularly directed to the manufacture of pigments of the type requiring heat treatment for imparting adequate pigment properties thereto, such as lithopone, zinc sulphide, and the like. The invention aims to provide an improved method of manufacturing pigments by wet chemical precipitation.

In the heretofore prevailing practices of making pigments by wet chemical precipitation, at least three fundamental steps are involved, namely, (1) precipitation, (2) drying and (3) disintegration. In the case of pigments requiring heat treating for the development of adequate pigment properties an additional step of muffling or calcination is involved. Taking lithopone as an example of a pigment of the latter class, eight distinct and separate operations are involved in its heretofore customary manufacturing process, namely, (1) precipitation, (2) filtration of the crude precipitate, (3) drying of the crude lithopone, (4) muffling or calcination and quenching of the muffled product in water, (5) filtering, (6) wet grinding, (7) drying and (8) grinding or disintegrating the calcined product. These operations are carried out in separate and distinct pieces of equipment with a definite break in the continuity of the process between each operation, and, excepting the two filtering and drying steps, the equipments for these various operations are of totally different types.

Our present invention, in its complete aspect, contemplates the manufacture of pigments of the character hereinbefore mentioned in practically one step or operation, and is based on our discovery of the advantageous effects, with respect to both process and product, resulting from carrying out the wet chemical precipitation of a pigment under conditions of relatively high pressure and elevated temperature. Thus, we have found that pigments, such as lithopone, zinc sulphid and the like, may advantageously be precipitated under relatively high pressure, and that by holding the precipitated pigment under such high pressure and at an elevated temperature for a suitable length of time, the resulting product (after appropriate drying) possesses the desired pigment properties. We have further found that appropriate drying and disintegration of the pigment precipitated under such conditions of high pressure and elevated temperature may be conveniently effected by suddenly releasing or lowering the pressure to which the pigment is subjected. Based on these discoveries, our present invention, in its complete aspect, involves carrying out the precipitation of the pigment under conditions of relatively high pressure and elevated temperature, and then subjecting the resulting precipitate to such a sudden or rapid lowering of the pressure to which it is exposed that adequate drying and disintegration of the precipitate for pigment purposes is thereby effected.

As a specific example of the practice of the invention, we will consider its application to the manufacture of lithopone. The operation is conveniently carried out in an autoclave or other appropriate apparatus capable of establishing and maintaining the contemplated high pressure and elevated temperature. The precipitating liquors (zinc sulphate and barium sulphide) are introduced into the autoclave in such a manner as to continuously and uniformly mix the two liquors, thereby precipitating the lithopone, and the autoclave is maintained at the high pressure and elevated temperature. Under these conditions, the precipitation of the lithopone is complete. The precipitated lithopone is held in the autoclave under these conditions of high pressure and elevated temperature for a suitable length of time (say approximately one hour) to develop those pigment properties heretofore imparted to lithopone by the customary muffling operation.

The precipitated lithopone is now discharged from the autoclave into an appropriate chamber maintained at a pressure considerably lower than that of the autoclave, say for example at atmospheric pressure. The chamber is preferably heated, by radiation or by hot gases, to a temperature in excess of 100° C. The sudden discharge of the precipitated lithopone into this chamber results in a rapid vaporization of the water associated therewith, and has the combined effect of drying the lithopone particles and of separating them in such a way that the resulting product has all of the characteristic pigment properties of lithopone produced in the heretofore customary series of operations. Indeed, lithopone made in accordance with our present invention is superior in several respects to that made in the heretofore customary manner.

The precipitating liquors introduced into the autoclave may be of about the same concentrations as heretofore employed in the industry. We prefer, however, to employ higher concentrations of the precipitating liquors than heretofore customary, since by so doing the amount of water which must be evaporated is reduced. Excellent results have been obtained with a zinc sulphate liquor of about 35° Bé., and a barium sulphide liquor of about 25° Bé.

Where the full effects of heat treatment are desired, equivalent to that obtained in the heretofore customary muffling or calcining operation, the temperature must be sufficiently high to attain these effects at the prevailing high pressure. While this temperature is somewhat lowered by increase of the prevailing pressure, it is not until a pressure of at least 2000 pounds per square inch is attained that the required temperature of heat treatment (for such pigments as lithopone and zinc sulphide) becomes sufficiently low to correspond with the temperature of saturated steam at that pressure. In practice, these conditions may be adequately realized by pressures of from 2,000 to 3,000 pounds per square inch and a temperature of about 350° C., thereby providing an atmosphere of saturated steam, such as must prevail in precipitation of the pigment from aqueous solutions.

When the pigment is precipitated from aqueous solutions at high or elevated temperatures, the pressure must be at least that of saturated steam at the prevailing temperature. Using water as the solvent, the maximum pressure obtainable (without the use of an inert gas) is approximately 3300 pounds per square inch; the pressure of saturated steam at the critical temperature. The use of solvents other than water makes possible the use of a different range of temperatures and pressures than obtainable with aqueous solutions.

Where precipitation and heat treatment are conducted in the presence of no other gas than the vapor of the water or other solvent, the pressure attainable is limited to the vapor pressure of the liquid associated with the precipitate at the prevailing temperature. Higher pressures may, however, be attained by introducing into the precipitating and heat treatment apparatus an inert gas under an appropriate pressure. By an inert gas we mean one that does not react with either the precipitate or the vapor of the solvent. Nitrogen is in most cases an available gas for the purpose. By the use of such an inert gas under a suitable pressure, precipitation and heat treatment may be carried out under any desired condition of pressure and at any temperature required in practice. Thus, pressures considerably in excess of 3000 pounds per square inch may be advantageously established within the precipitating apparatus by the use of an appropriate inert gas under a suitable pressure, and the temperature required for the full effects of heat treatment will be correspondingly lower at such higher pressures.

In general, the higher is the pressure to which the precipitate is exposed for heat treatment purposes, the lower is the temperature or the shorter is the time of treatment at the same temperature, in order to attain equivalent effects of heat treatment. Thus, at excessively high pressures, say 10,000 pounds per square inch or even higher, the temperature required for heat treatment may be relatively low, or the duration of the heat treatment may be relatively short. A heat treatment of lithopone and zinc sulphide, equivalent to that resulting from the heretofore customary muffling or calcining operation, is attained under pressures of from 2000 to 3000 pounds per square inch at a temperature of about 350° C. with a treatment period of approximately one hour. It is our present preferred practice to carry out the precipitation and heat treatment at approximately the same pressure and temperature, although the step of precipitation may be conducted under differing conditions of both pressure and temperature to those prevailing during heat treatment.

For some purposes the pigment does not require the full effects of heat treatment, as, for example, where the pigment is to be used as a reinforcing agent in compounded rubber. In such cases, a lower temperature or a shortened time of heat treatment at a given pressure may be utilized. In practice, that combination of pressure, temperature and duration of heat treatment should be chosen which best meets the particular conditions in hand.

The precipitated lithopone or other pigment is preferably freed of the bulk of the liquor in which precipitation takes place before its discharge from the autoclave. This may be done by bleeding off a certain amount of steam from the autoclave, by segregation or concentration of the precipitate within the autoclave, or in any other appropriate manner. The desired aim in this connection is to discharge the precipitate from the autoclave with only such amount of associated water as will be readily evaporated at the reduced pressure prevailing in the discharge chamber.

Various types and forms of apparatus may be utilized in the practice of the invention. Depending upon the type of apparatus employed, precipitation, heat treatment and discharge of the precipitated pigment may be carried out in a continuous manner or as an intermittent or batch operation. Precipitation and heat treatment may take place in one and the same apparatus and hence in one stage, or may be carried out in two appropriately communicating apparatus in two stages. In the one stage operation conducted intermittently and in the two-stage operation, water (or other solvent) may be evaporated during the heat treatment by appropriately bleeding off steam to any desired extent. It is possible by bleeding off steam in this manner to so reduce the amount of moisture associated with the precipitated pigment that the heat treatment operation may be completed in an atmosphere of superheated steam, and hence at lower pressures and higher temperatures than must prevail when the same heat treatment effect is to be obtained in an atmosphere of saturated steam.

We claim:

1. The improvement in the method of making a pigment by wet chemical precipitation, which comprises carrying out the precipitation of the pigment under conditions of relatively high pressure and elevated temperature, and subjecting the resulting precipitate to such a rapid lowering of the pressure to which it is subjected that adequate drying and disintegration of the precipitate for pigment purposes is thereby effected.

2. The improvement in the method of making a pigment by wet chemical precipitation, which comprises carrying out the precipitation of the pigment under conditions of relatively high pressure and elevated temperature, and delivering the resulting precipitate, substantially freed of the bulk of the liquor in which precipitation took place, from the environment of relatively high pressure in which it is formed to an environment of such lower pressure that adequate drying and disintegration of the precipitate for pigment purposes is thereby effected.

3. The improvement in the method of making a pigment by wet chemical precipitation, which comprises carrying out the precipitation of the pigment under conditions of relatively high pressure and elevated temperature, and delivering the resulting precipitate from the environment of relatively high pressure under which it has been continuously maintained since its formation to an environment of such lower pressure that adequate drying and disintegration of the precipitate for pigment purposes is thereby effected.

4. The improvement in the method of making a pigment by wet chemical precipitation, which comprises carrying out the precipitation of the pigment under a pressure exceeding 3000 pounds per square inch and at a temperature not exceeding 350° C., and subjecting the resulting precipitate to such a rapid lowering of the pressure to which it is subjected that adequate drying and disintegration of the precipitate for pigment purposes is thereby effected.

5. The improvement in the method of making a pigment by wet chemical precipitation, which comprises carrying out the precipitation of the pigment under a pressure of at least 1000 pounds per square inch and at a temperature approximating that of the saturated vapor of the liquid associated with the precipitate at the prevailing pressure, and subjecting the resulting precipitate to such a rapid lowering of the pressure to which it is subjected that adequate drying and disintegration of the precipitate for pigment purposes is thereby effected.

6. The improvement in the method of making a pigment by wet chemical precipitation, which comprises carrying out the precipitation of the pigment under a pressure of at least 1000 pounds per square inch and at a temperature approximating that of the saturated vapor of the liquid associated with the precipitate at the prevailing pressure, exposing the resulting precipitate to said conditions of pressure and temperature for a sufficient period of time to impart thereto adequate pigment properties, and delivering the resulting precipitate from the environment of relatively high pressure to a heated environment of such lower pressure that adequate drying and disintegration of the precipitate for pigment purposes is thereby effected.

7. The improvement in the method of making a pigment by wet chemical precipitation, which comprises carrying out the precipitation of the pigment under conditions of relatively high pressure and elevated temperature, effecting a substantial separation of the resulting precipitate from the bulk of the liquor in which precipitation took place, and subjecting the so-separated precipitate to such a rapid lowering of the pressure to which it is subjected that adequate drying and disintegration of the precipitate for pigment purposes is thereby effected.

8. The improvement in the method of making a pigment by wet chemical precipitation, which comprises carrying out the precipitation of the pigment under conditions of relatively high pressure and elevated temperature, and subjecting the resulting precipitate, heretofore continuously maintained under approximately the same conditions of temperature and pressure as attended its formation, to a sudden and substantial reduction of the pressure to which it is subjected.

9. The improvement in the method of making a pigment by wet chemical precipitation, which comprises carrying out the precipitation of the pigment under conditions of relatively high pressure and elevated temperature, and subjecting the resulting precipitate, substantially free of the bulk of the liquor in which precipitation took place while continuously maintained under approximately the same conditions of temperature and pressure as attended its formation, to a sudden lowering of the pressure to which it is subjected to approximately atmospheric pressure.

10. The improvement in the method of making a pigment by wet chemical precipitation, which comprises carrying out the precipitation of the pigment under a pressure of from 2000 to 3000 pounds per square inch and at a temperature of approximately 350° C., and delivering the resulting precipitate from the environment of relatively high pressure under which it is formed to an environment of such lower pressure that adequate drying and disintegration of the precipitate for pigment purposes is thereby effected.

11. The improvement in the method of making by wet chemical precipitation a pigment of the type requiring heat treatment for imparting adequate pigment properties thereto, which comprises carrying out the precipitation of the pigment under conditions of relatively high pressure and elevated temperature and exposing the resulting precipitate to said conditions of pressure and temperature for a sufficient period of time to impart thereto those adequate pigment properties heretofore acquired in a subsequent and independent heat treatment, and subjecting the resulting precipitate to such a rapid lowering of the pressure to which it is exposed that adequate drying and disintegration of the precipitate for pigment purposes is thereby effected.

12. The improvement in the method of making by wet chemical precipitation a pigment of the type requiring heat treatment for imparting adequate pigment properties thereto, which comprises carrying out the precipitation of the pigment under a pressure of at least 2000 pounds per square inch and at a temperature corresponding approximately to that of saturated steam at the prevailing pressure, exposing the resulting precipitate to said conditions of high pressure and elevated temperature for a sufficient period of time to impart thereto those adequate pigment properties heretofore acquired in a subsequent and independent heat treatment, and subjecting the resulting precipitate to such a rapid lowering of the pressure to which it is exposed that adequate drying and disintegration of the precipitate for pigment purposes is thereby effected.

13. The improvement in the method of making lithopone, which comprises carrying out the precipitation of the lithopone under conditions of relatively high pressure and elevated temperature, and subjecting the resulting precipitate to such a rapid lowering of the pressure to which it is exposed that adequate drying and disintegration of the precipitate for pigment purposes is thereby effected.

14. The improvement in the method of making lithopone, which comprises carrying out the precipitation of the lithopone under conditions of relatively high pressure and elevated temperature and exposing the resulting precipitate to said conditions of pressure and temperature for a sufficient period of time to impart thereto those adequate pigment properties heretofore acquired in a subsequent and independent heat treatment, and then subjecting the lithopone precipitate to such a rapid lowering of the pressure to which it is exposed that adequate drying and disintegration of the precipitate for pigment purposes is thereby effected.

15. The improvement in the method of making lithopone, which comprises carrying out the precipitation of the lithopone under a pressure of from 2000 to 3000 pounds per square inch and at a temperature of approximately 350° C., and delivering the resulting lithopone precipitate from the environment of relatively high pressure under which it is formed to an environment of such lower pressure that adequate drying and disintegration of the precipitate for pigment purposes is thereby effected.

16. The improvement in the method of making lithopone, which comprises carrying out the precipitation of the lithopone under a pressure exceeding 3000 pounds per square inch and at a temperature not exceeding 350° C., and subjecting the resulting lithopone precipitate to such a rapid lowering of the pressure to which it is subjected that adequate drying and disintegration of the precipitate for pigment purposes is thereby effected.

17. The improvement in the method of making lithopone, which comprises carrying out the precipitation of the lithopone under a pressure of at least 2000 pounds per square inch and at a temperature corresponding approximately to that of saturated steam at the prevailing pressure, exposing the resulting lithopone precipitate to said conditions of high pressure and elevated temperature for a sufficient period of time to impart thereto those adequate pigment properties heretofore acquired in a subsequent and independent heat treatment, and then subjecting the lithopone precipitate to such a rapid lowering of the pressure to which it is exposed that adequate drying and disintegration of the precipitate for pigment purposes is thereby effected.

18. The improvement in the method of making pigment zinc sulphide by wet chemical precipitation, which comprises carrying out the precipitation of the zinc sulphide under conditions of relatively high pressure and elevated temperature, and subjecting the resulting precipitate to such a rapid lowering of the pressure to which it is exposed that adequate drying and disintegration of the precipitate for pigment purposes is thereby effected.

19. The improvement in the method of making pigment zinc sulphide by wet chemical precipitation, which comprises carrying out the precipitation of the zinc sulphide under conditions of relatively high pressure and elevated temperature and exposing the resulting precipitate to said conditions of pressure and temperature for a sufficient period of time to impart thereto those adequate pigment properties heretofore acquired in a subsequent and independent heat treatment, and then subjecting the zinc sulphide precipitate to such a rapid lowering of the pressure to which it is exposed that adequate drying and disintegration of the precipitate for pigment purposes is thereby effected.

20. The improvement in the method of making pigment zinc sulphide by wet chemical precipitation, which comprises carrying out the precipitation of the zinc sulphide under a pressure of from 2000 to 3000 pounds per square inch and at a temperature of approximately 350° C., and delivering the resulting zinc sulphide precipitate from the environment of relatively high pressure under which it is formed to an environment of such lower pressure that adequate drying and disintegration of the precipitate for pigment purposes is thereby effected.

21. The improvement in the method of making pigment zinc sulphide by wet chemical precipitation, which comprises carrying out the precipitation of the zinc sulphide under a pressure exceeding 3000 pounds per square inch and at a temperature not exceeding 350° C., and subjecting the resulting zinc sulphide precipitate to such a rapid lowering of the pressure to which it is subjected that adequate drying and disintegration of the precipitate for pigment purposes is thereby effected.

22. The improvement in the method of making pigment zinc sulphide by wet chemical precipitation, which comprises carrying out the precipitation of the zinc sulphide under a pressure of at least 2000 pounds per square inch and at a temperature corresponding approximately to that of saturated steam at the prevailing pressure, exposing the resulting zinc sulphide precipitate to said conditions of high pressure and elevated temperature for a sufficient period of time to impart thereto those adequate pigment properties heretofore acquired in a subsequent and independent heat treatment, and then subjecting the zinc sulphide precipitate to such a rapid lowering of the pressure to which it is exposed that adequate drying and disintegration of the precipitate for pigment purposes is thereby effected.

In testimony whereof we affix our signatures.

GEORGE F. A. STUTZ.
HARLAN A. DEPEW.